US010695998B2

(12) United States Patent
Sassaman et al.

(10) Patent No.: US 10,695,998 B2
(45) Date of Patent: Jun. 30, 2020

(54) CUTTER FOR TIRE BEAD WINDER

(71) Applicant: Bartell Machinery Systems, LLC, Rome, NY (US)

(72) Inventors: Douglas Maxwell Sassaman, Rome, NY (US); Christopher L. Johnson, Blossvale, NY (US)

(73) Assignee: BARTELL MACHINERY SYSTEMS, L.L.C., Rome, NY (US)

( * ) Notice: Subject to any disclaimer, the term of this patent is extended or adjusted under 35 U.S.C. 154(b) by 452 days.

(21) Appl. No.: 15/493,989

(22) Filed: Apr. 21, 2017

(65) Prior Publication Data
US 2017/0313008 A1 Nov. 2, 2017

Related U.S. Application Data

(60) Provisional application No. 62/330,797, filed on May 2, 2016.

(51) Int. Cl.
*B29D 30/50* (2006.01)
*B21F 33/00* (2006.01)
B29D 30/48 (2006.01)

(52) U.S. Cl.
CPC ............ *B29D 30/50* (2013.01); *B21F 33/005* (2013.01); *B29D 2030/487* (2013.01)

(58) Field of Classification Search
CPC .. B29D 30/50; B29D 2030/487; B21F 33/005
USPC ......................................................... 83/651
See application file for complete search history.

(56) References Cited

U.S. PATENT DOCUMENTS

| 4,233,870 A | 11/1980 | Gott et al. |
| 2014/0096660 A1* | 4/2014 | Turner ............... C13B 5/08 83/651 |
| 2017/0313008 A1* | 11/2017 | Sassaman ............. B29D 30/50 |

(Continued)

FOREIGN PATENT DOCUMENTS

| BE | 874595 | 7/1979 |
| CN | 101143393 | 3/2008 |
| CN | 101480735 A | 7/2009 |

(Continued)

OTHER PUBLICATIONS

International Search Report and Written Opinion for PCT/US2017/028890 dated Aug. 1, 2017, 16 pgs.

(Continued)

*Primary Examiner* — Omar Flores Sanchez
(74) *Attorney, Agent, or Firm* — Brinks Gilson & Lione

(57) ABSTRACT

A cutting apparatus for an elongate wire is provided, and includes a housing that supports a first cutter that has a body, a recess, and a cutting blade. The cutting blade is disposed upon a wall of the body that defines the recess, the first cutter is fixed with respect to the housing. The housing additionally supports a second cutter that has a body, a recess, and a cutting blade, wherein the cutting blade is disposed upon a wall of the body that defines the recess. The second cutter is normally positioned with respect to the first cutter such that the recess of the first cutter is aligned with the recess of the second cutter, and is movable to a second position where the recess of the second cutter translates with respect to the recess of the first cutter, such that the respective cutting blades translate toward each other.

20 Claims, 8 Drawing Sheets

(56) References Cited

U.S. PATENT DOCUMENTS

2017/0368776 A1* 12/2017 De Giglio .............. B29D 30/50

FOREIGN PATENT DOCUMENTS

| DE | 19640550 | 5/1997 |
| SU | 591272 | 2/1978 |
| WO | WO83/00647 | 3/1983 |

OTHER PUBLICATIONS

First Office Action for Chinese Patent Application 201780027197.X dated Dec. 18, 2019, 10 pgs in English.

* cited by examiner

CUTTER FOR TIRE BEAD WINDER

PRIORITY CLAIM

This invention claims the benefit of priority of U.S. Provisional Application Ser. No. 62/330,797, entitled "Cutter for Tire Bead Winder," filed May 2, 2016, the disclosure of which is hereby incorporated by reference in its entirety.

TECHNICAL FIELD

This disclosure relates to a reciprocating cutter for a tire bead winder, but the disclosed device may be applicable for cutters for wires for other applications.

BRIEF SUMMARY

A first representative embodiment of the disclosure is provided. The embodiment includes a cutting apparatus for an elongate wire. The cutting apparatus includes a housing that supports a first cutter that has a body, a recess, and a cutting blade, wherein the cutting blade is disposed upon a wall of the body that defines the recess, the first cutter is fixed with respect to the housing. The housing additionally supports a second cutter that has a body, a recess, and a cutting blade, wherein the cutting blade is disposed upon a wall of the body that defines the recess, the second cutter is reciprocatingly movable with respect to the housing and with respect to the first cutter, wherein the second cutter is normally positioned with respect to the first cutter such that the recess of the first cutter is aligned with the recess of the second cutter, and wherein the second cutter is movable to a second position where the recess of the second cutter translates with respect to the recess of the first cutter, such that the respective cutting blades of the first and second cutters translate toward each other. An input device is fixed to the second cutter to urge linear motion of the second cutter with respect to the first cutter. The first and second cutters can be mounted with respect to each other at a first consistent vertical position with respect to the housing and a second consistent vertical position above the first consistent vertical position.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
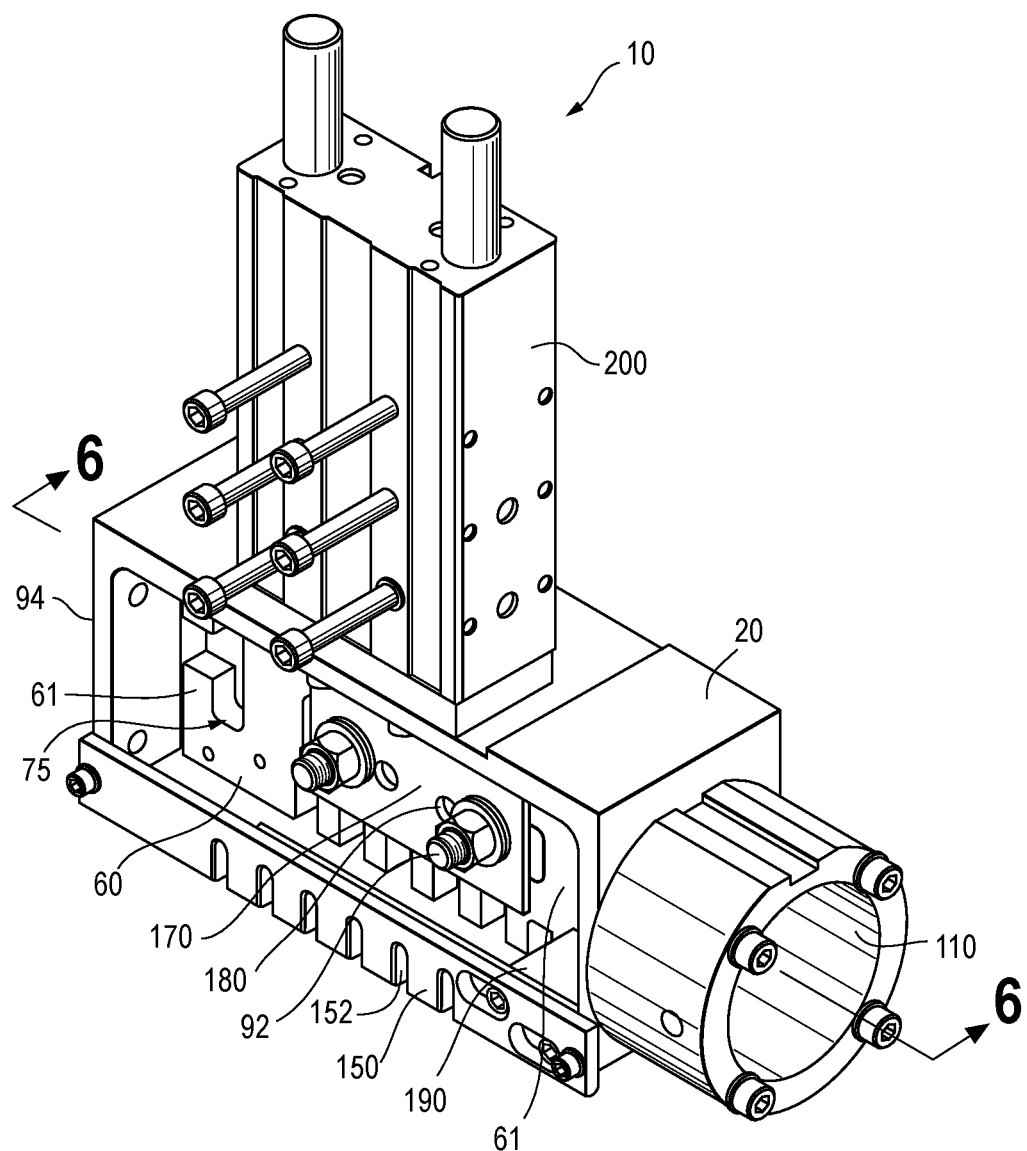
FIG. 1 is a perspective view of a reciprocating cutter assembly usable for a tire bead winding machine.
Figure 2:
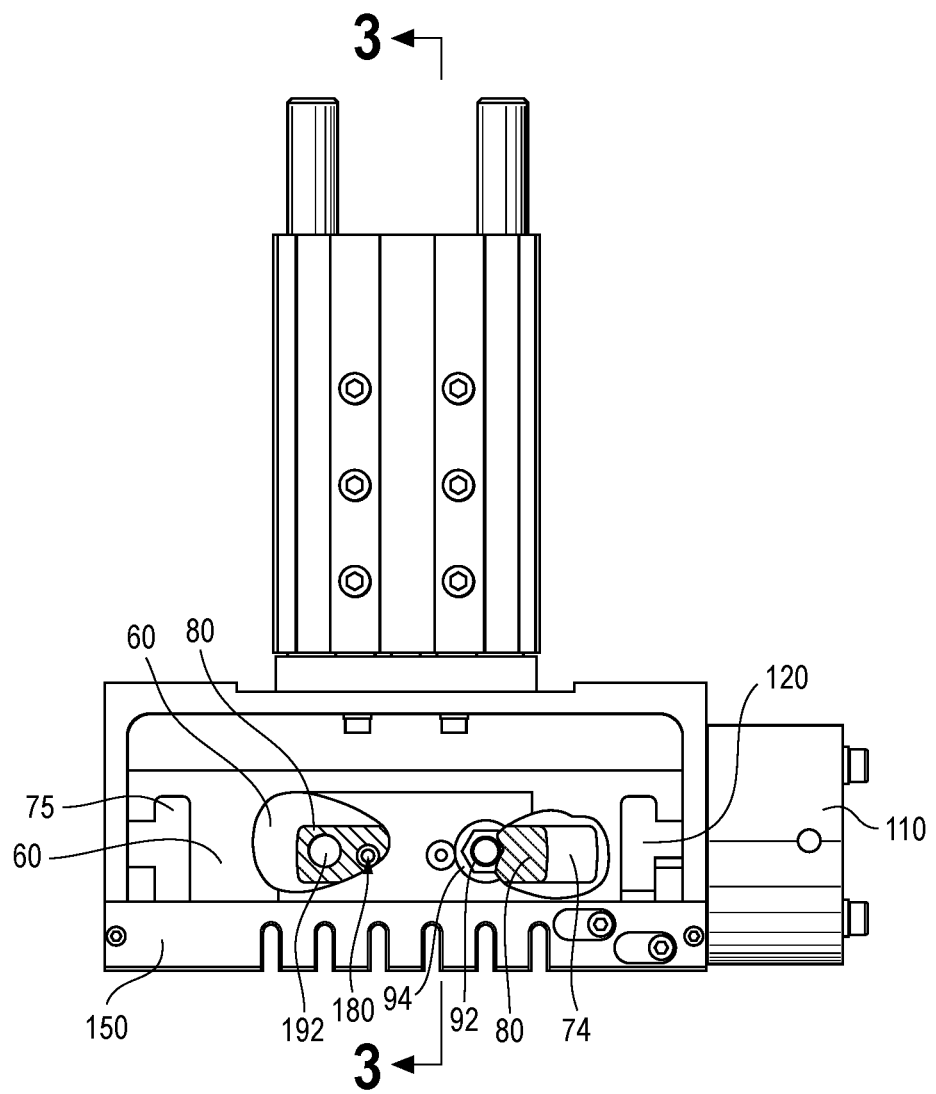
FIG. 2 is a side view of the reciprocating cutter assembly of FIG. 1 with a portion of the wear plate removed.

Turning now to FIGS. 1-12, a cutting assembly 10 is provided. The cutting assembly 10 may be used with a tire bead wire machine, and specifically used to reciprocate toward and cut wires that are aligned with a tire bead winding mandrel after the tire bead winding process has been completed for an assembly of an individual wire wound tire. In other embodiments, the disclosed design may be successfully used in other technical situations where a wire is periodically cut after an industrial manufacturing process, with opposed cutting blades that reciprocate or move with respect to each other to cut a wire therebetween. For the sake of brevity, this disclosure will discuss the construction and operation of the design with respect to a tire bead cutting system, but one of ordinary skill in the art will understand that this design could be successfully used for other processes.

The assembly 10 may be configured to be cyclically raised and lowered (or otherwise cyclically moved toward) toward one or more workpieces, such as stretched wires 300, which are intended to be cut to length during a manufacturing process. The assembly may include suitable actuators to allow the assembly to be precisely moved toward and away from the workpiece at a precise location with respect to the workpiece (as discussed below) and at a specific time as appropriate for action in cutting the workpiece. A portion of the mechanism to raise and lower the assembly is depicted as 200 in the figures.

As best shown in FIGS. 1-6, the assembly 10 may include a housing 20 that supports (fixedly and movedly as discussed herein) the components of the assembly. The housing 20 is moved with respect to the workpiece along with the other components discussed herein. The housing 20 may support a fixed, first, cutter 40 and a second reciprocatingly movable second cutter 60. The housing may further support a fixed comb 150 that further aligns the wire downstream of the first and second cutters 40, 60, and in some embodiments, a moving support plate 152 that interacts with the fixed comb 150 to support a wire after it has been cut by the first and second cutters 40, 60. A standoff 190 may be provided to space the comb 150 and support plate 152 from the first and second cutters 40, 60, discussed below. In some embodiments, the moving support plate 150 may move with the reciprocation of the second cutter 60 (discussed below).

Figure 4:
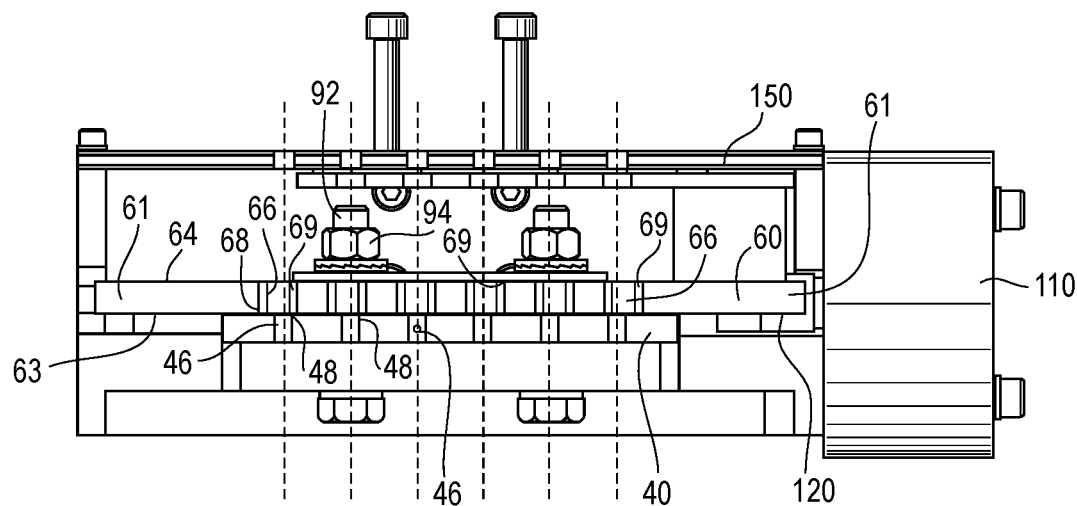
FIG. 4 is a bottom view of the cutter assembly of FIG. 1 with the second cutter in the normal position.
Figure 5:
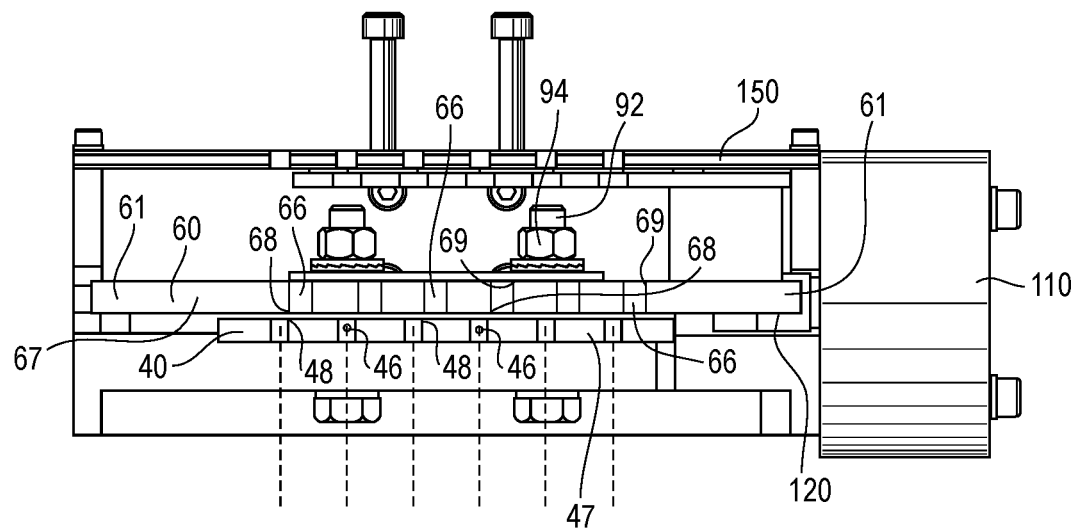
FIG. 5 is the view of FIG. 4 with the second cutter in the cutting position.
Figure 6:
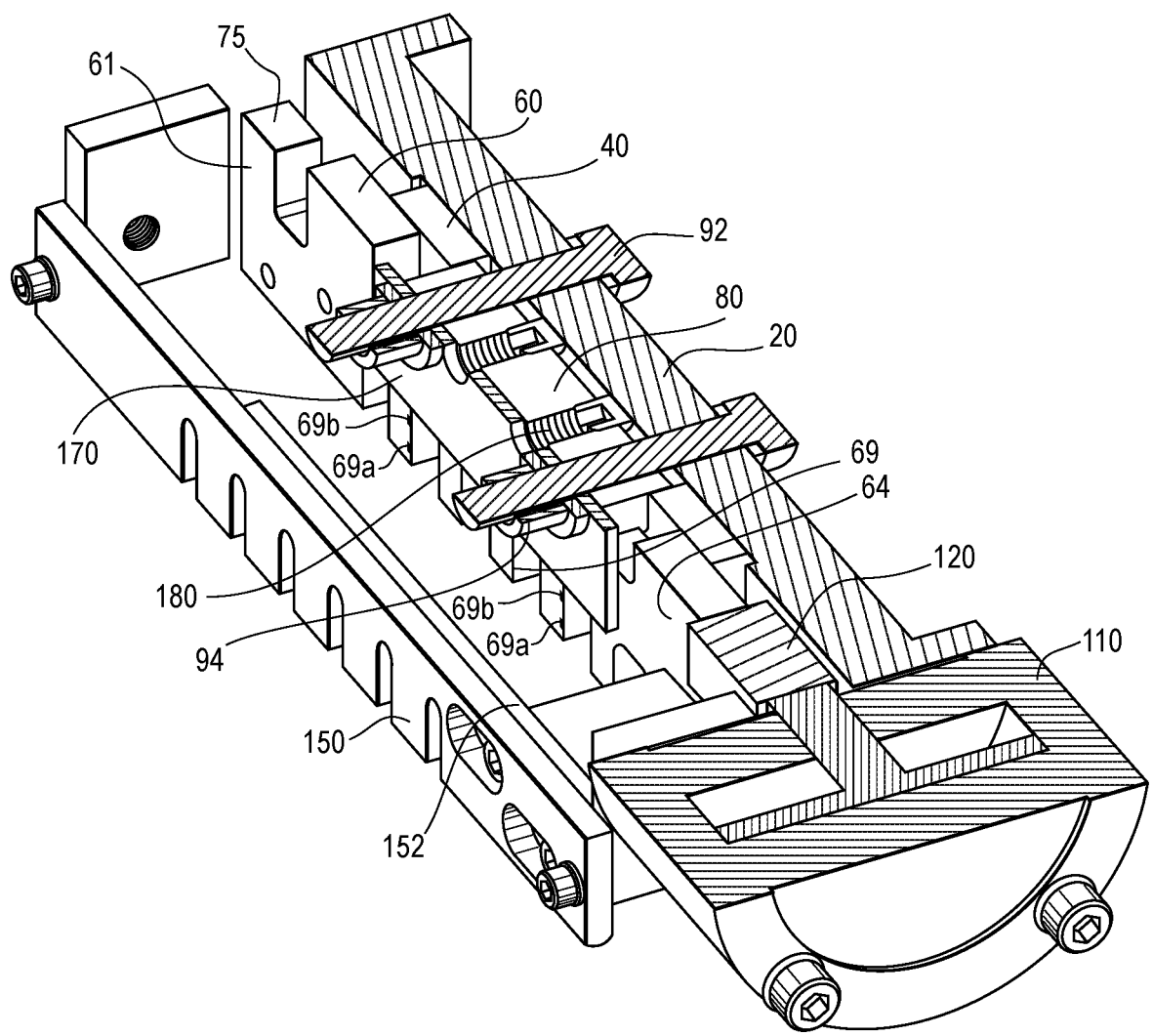
FIG. 6 is a horizontal sectional view of section B-B of FIG. 1.

Further, the housing 20 may support an actuator 110 that selectively causes the second cutter 60 to slide with respect to the first cutter, such that wires disposed through aligned recesses 46, 66 in the first and second cutters 40, 60 are guillotine cut as the second cutter 60 translates horizontally with respect to the first cutter 40 such that the opposed cutting blades 48, 68 of the first and second cutters are urged to cut through the wire 300 (best understood with review of FIGS. 4 and 5). One of ordinary skill in the art with a thorough review of this specification will understand that the directional terms (e.g. horizontal, vertical etc.) are used with respect to the figures showing the preferred embodiment. Other contemplated embodiments that are designed and operate in a manner similar to that disclosed herein may be oriented such that other directional and relative terms may applicable yet still fall within the scope of this disclosure. The actuator 110 may be a pneumatic system, such as to urge reciprocating motion of the second cutter 60 from the normal position (FIG. 4) to the cutting position (FIG. 5) when high pressure air is ported to the actuator 110 and allows the second cutter 60 to return to the normal position when the air is released. In other embodiments, the actuator 110 may be a linear actuator, a solenoid, or other electro-mechanical device.

Figure 8:
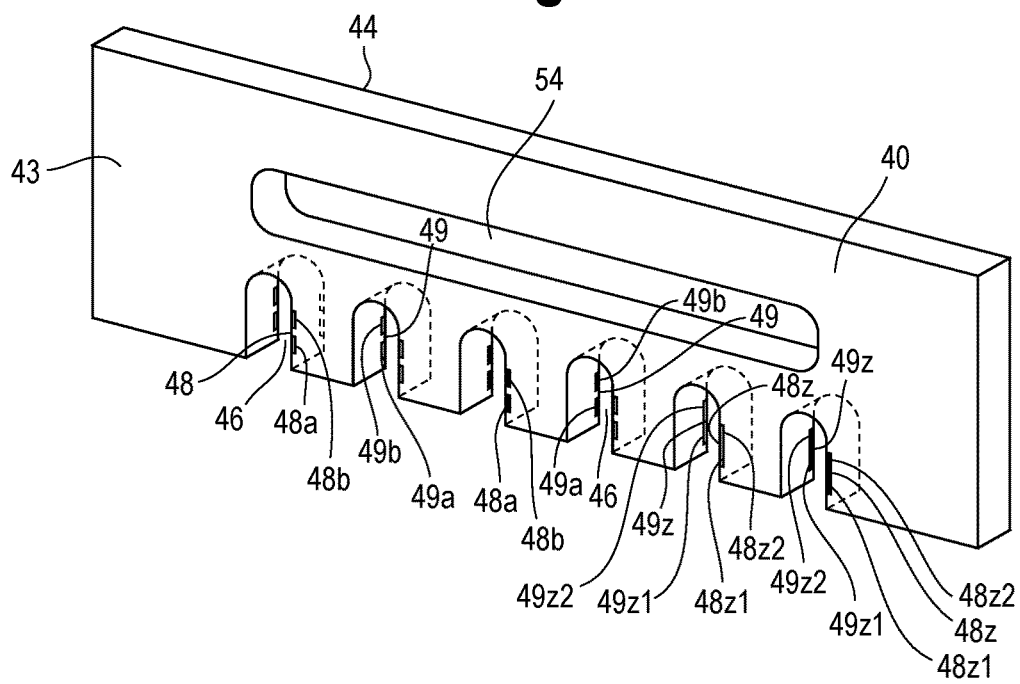
FIG. 8 is a perspective view of the first cutter of the assembly of FIG. 1.

The first cutter 40 is best shown in FIG. 8 and includes opposite first and second side surfaces 43, 44. The first cutter 40 additionally includes from its bottom surface 47 one or a plurality of recesses 46 that are disposed to allow a workpiece, such as a wire 300 to extend therethrough. In some embodiments, the assembly 10 may be configured to cut 1, 2, 3, 4, 5, 6, 8, 10 or another number of wires simultaneously and the first cutter 40 may include the number (or more) recesses than the assembly 10 is intended to cut. Each recess 46 may define one or two cutting surfaces 48, 49. A first cutting surface 48 is disposed at an edge between the first side surface 43 and a side wall that forms the recess 46. In some embodiments, the first cutter 40 may be reversible with a second cutting surface 49 disposed at an edge between the second side surface 44 and a side wall that forms the recess 46. As shown schematically in FIG. 8 the first cutting surface 48 (and when provided the second cutting surface 49) may have two cutting portions 48a, 48b that are spaced vertically from each other.

Figure 12:
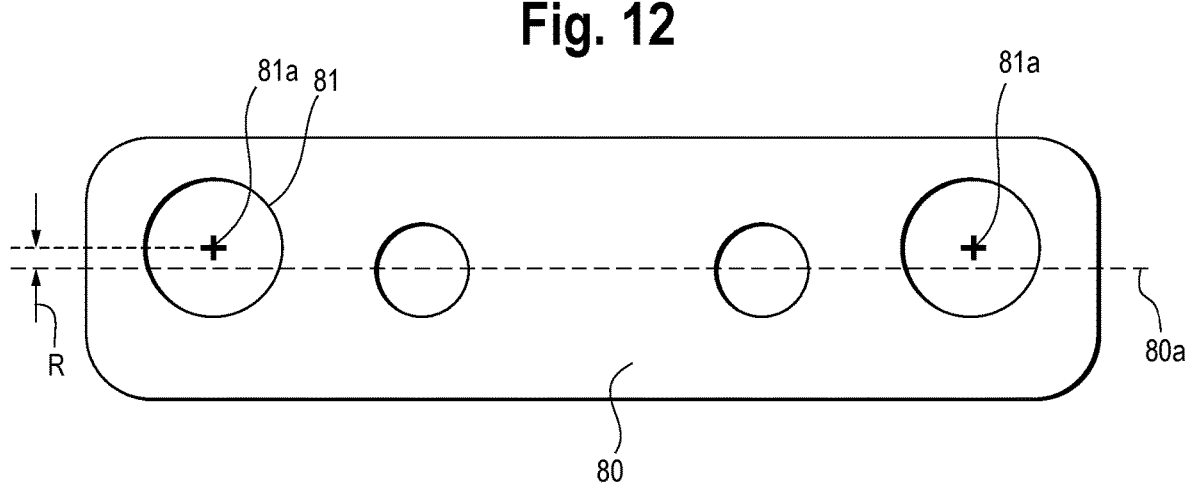
FIG. 12 is a front view of the bushing of FIG. 11.

The two cutting portions 48a, 48b (49a, 49b) may be provided as two discrete portions (depicted as 48a, 48b, 49a, 49b) that are discontinuous from each other, or may be provided as a long cutting portion 48z, (49z) that extends between two opposite ends 48z1, 48z2 (49z1, 49z2) that serve as discrete cutting portions. The first and second cutting portions (e.g. 48a, 48b) are spaced apart a distance that is equal to twice the set off distance R between the centers 81a of the apertures 81 to the longitudinal centerline 80 of the bushing 80, discussed below (FIG. 12).

Figure 7:
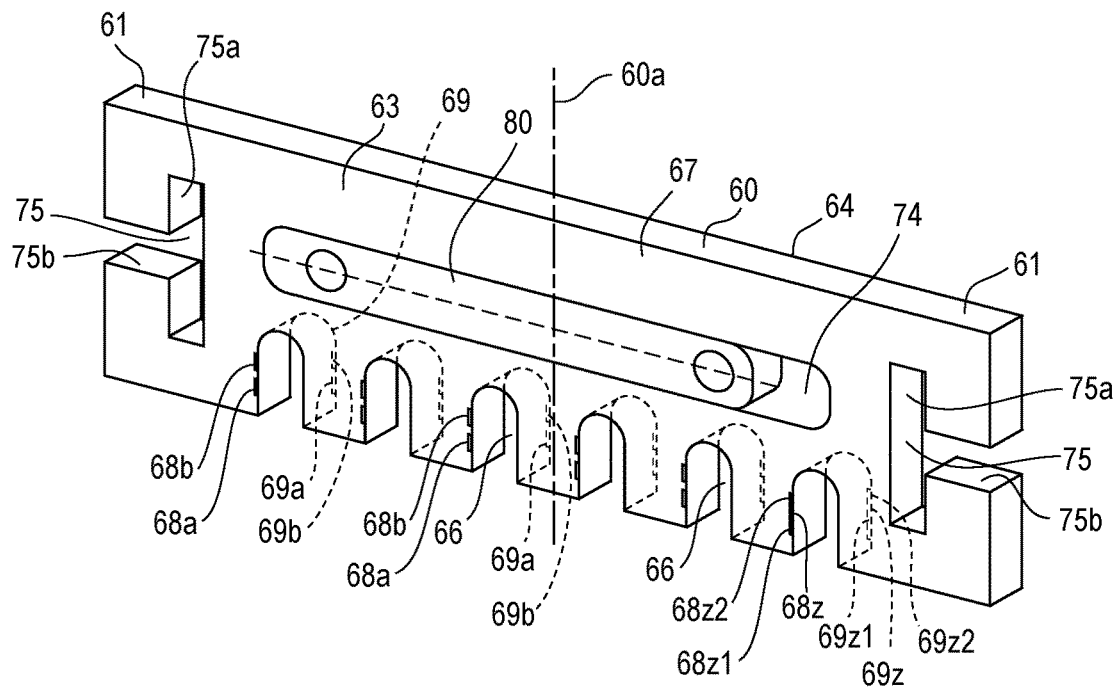
FIG. 7 is a perspective view of the second cutter of the assembly of FIG. 1.

The second cutter 60 is best shown in FIG. 7. The second cutter 60 extends between opposite ends 61 and may be symmetrical about its vertical axis 60a. The second cutter 60 includes opposite second side surfaces 63, 64. The second cutter 60 additionally includes from its bottom surface 67 one or a plurality of recesses 66 that are disposed to allow a workpiece, such as a wire 300 to extend therethrough. In some embodiments, the second cutter 60 may include the same number of recesses 66 as the number of recesses 46 in the first cutter 40, and at the same relative positioning. In other embodiments, the second cutter 60 may include more recesses than the first cutter 60, as necessitated in embodiments where the second cutter 60 is reversible when the first cutter 40 is not. Each recess of the second cutter 60 may define two cutting surfaces 68, 69. A first cutting surface 68 is disposed at an edge between the first side surface 63 and a side wall that forms the recess 66 and a second cutting surface 69 disposed at an edge between the second side surface 64 and a side wall that forms the recess 66. As shown schematically in FIG. 7 the first cutting surface 68 may have two cutting portions 68a, 68b that are spaced vertically from each other.

The two cutting portions 68a, 68b, 69a, 69b of each cutting edge 68, 69 may be provided as two discrete portions (depicted as 68a, 68b, 69a, 69b) that are discontinuous from each other, or may be provided as a long cutting portion 68z, 69z that extends between two opposite ends 68z1, 68z2, 69z1, 69z2 that serve as discrete cutting portions. The first and second cutting portions (e.g. 68a, 68b) are spaced apart a distance that is equal to twice the set off distance R between the centers 81a of the apertures 81 to the longitudinal centerline 80 of the bushing 80, discussed below (FIG. 12).

The second cutter 60 may additionally include a structure configured to removably receive an operator, such as an arm 120 from the actuator 110 to urge the second cutter 60 to slidingly reciprocate within the housing 20 and with respect to the first cutter 40 (and with respect to the wire(s) that extend through recesses 66 in the second cutter 60. In some embodiments, the structure may be a slot 75 that is provided upon both end portions 61 of the second cutter 60.

In a preferred embodiment, the slot 75 may be a "T" shape with an upper portion 75a (formed from the top, horizontal member of the letter "T") and a lower portion 75b (formed from the bottom, vertical member of the letter "T"). In this embodiment, the arm 120 may be a corresponding "T" shape although slightly smaller than the T shaped slot 75. Specifically, the length of the upper portion 75 may be at least twice the distance R (FIG. 12) of the bushing 80 (discussed below) greater than the length of the upper portion 120a of the arm 120 (the difference in length depicted as distance X on FIG. 9). In some embodiments the width of the lower portion 75b may be at least twice the distance R of the bushing 80 greater than the width of the lower portion 120b of the arm 120 (the difference in width depicted as distance V on FIG. 10). The slot 75 may be configured such that the arm 120 can slide into the slot as the second cutter 60 is slid onto the housing 20, such that the bushing 80 extends through the central slot 74 of the second cutter 60. In other embodiments, the slot 75 may be shaped in other geometries and sizes to allow the slot to receive the arm in the different relative vertical positions of the second cutter with respect to the housing 20 (as discussed below).

Figure 9:
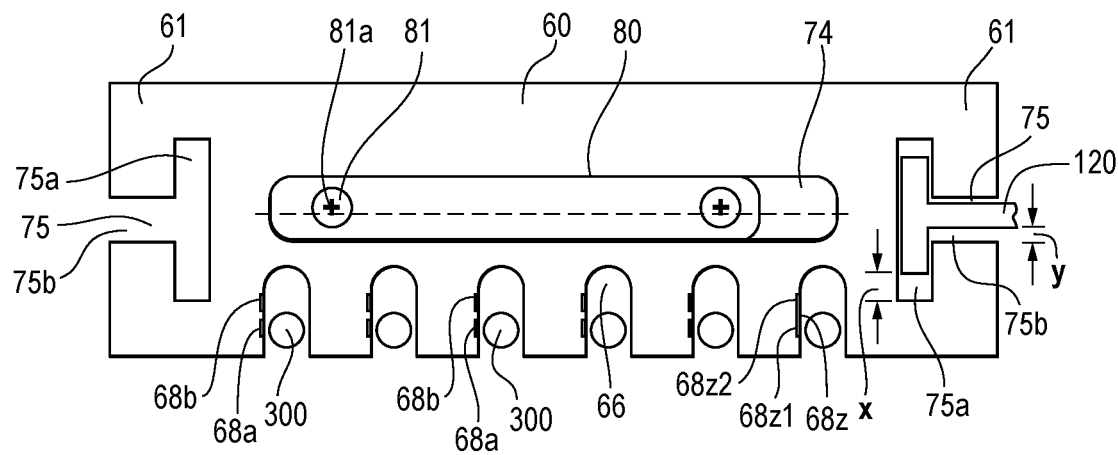
FIG. 9 is a side view of the second cutter of FIG. 7 depicting the second cutter aligned for wires extending through the recesses of the second cutter aligned to interact with the first cutting portion of the first cutting blades of each recess.
Figure 10:
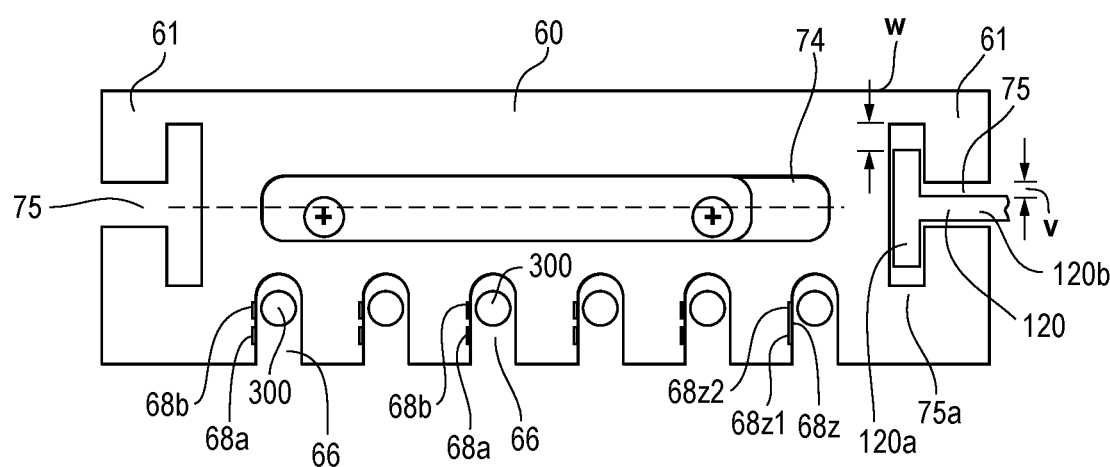
FIG. 10 is the view of FIG. 9 depicting the cutter aligned for wires extending through the recesses of the second cutter aligned to interact with the second cutting portion of the first cutting blades of each recess.
Figure 11:
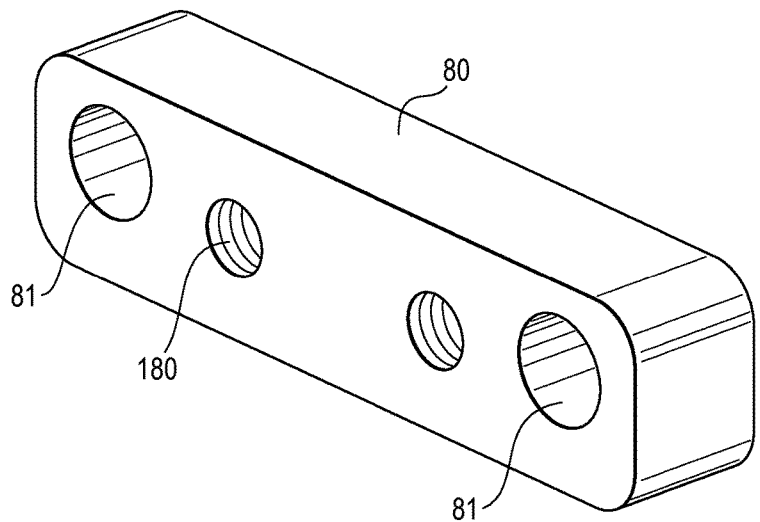
FIG. 11 is a perspective view of a bushing of the cutting assembly of FIG.

The housing 20 may further support a bushing 80 that interacts with at least the second cutter 60 to position the second cutter 60 with respect to the housing. In some embodiments, the second cutter 60 may include a central slot 74 through which a portion of the bushing 80 extends. In some embodiments, the bushing 80 may additionally interact with the first cutter 40 to position the first cutter 40 with respect to the housing 20 and the second cutter 60. In some embodiments, the first cutter may include a central slot 54 through which a portion of the bushing 80 extends. In other embodiments, the second cutter 60 and where applicable the first cutter 40 may interact or be positioned with respect to the housing 20 in a different manner, such as the bushing supporting portions of the second cutter 60 and in some embodiments the first cutter 40 without extending through a slot in the respective cutter 60, 40. As shown in FIGS. 9 and 10, the slot 74 in the second cutter 60 may be longer than the length of the bushing 80 to allow freedom for the second cutter 60 to reciprocate with respect to the fixed first cutter 40, and the fixed bushing 80 as urged by the actuator 110, such that the slot 74 is at least as long as the length of the bushing 80 and the length of travel of the second cutter 60.

The height of the slot 74 (and slot 54, when the bushing 80 extends therethrough) may be just slightly higher than a height of the bushing 80.

Figure 3:
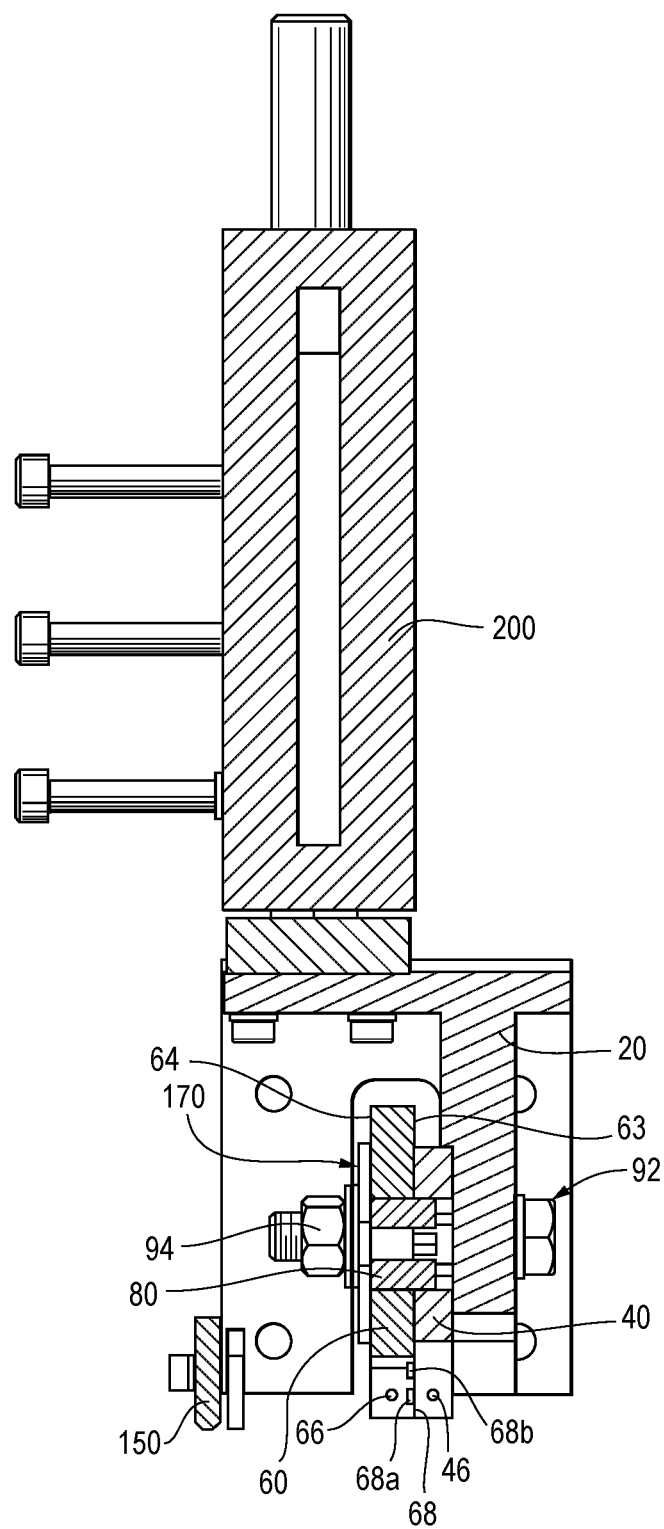
FIG. 3 is a sectional view of section A-A of FIG. 2.

As best shown in FIG. 3, the bushing 80 is fixed to the housing 20 with one or more bolts 92 that extends through respective one or more apertures in the housing 20 and respective one or more apertures 81 in the bushing 80. In some embodiments, a wear plate 170 may be positioned outboard of the second cutter 60 to act as the bearing surface of a nut 94 that threadingly fixes to the bolt 92.

The centers 81a of the apertures 81 in the bushing 80 may be disposed in a vertically offset manner from a longitudinal centerline 80a of the bushing 80. The bushing 80 may be positioned with respect to the housing 20 (with partial disassembly of the other portions of the assembly 10 discussed herein) such that in a first position of the bushing 80 the apertures 81 are positioned in the housing such that their centers 81a are above the longitudinal centerline 80a of the bushing 80, as shown in FIG. 9. The bushing 80 may also be positioned with respect to the housing 20 in a second position such that the apertures 81 are positioned such that their centers 81a are below the longitudinal centerline 80a of the bushing 80, as shown in FIG. 10. As can be understood with reference to FIGS. 9 and 10 in the position where the apertures 81 are positioned with their centers 81a above the longitudinal centerline 80a, the bottom surface 67 of the second cutter 60 (and the bottom surface 47 of the first cutter 40 where applicable) is positioned at a lower relative position with respect to the housing than when the bushing is aligned with the centers 81a are below the longitudinal centerline 80a of the bushing 80.

With continued reference to FIGS. 9 and 10, the installed position of the bushing 80 modifies a location where a single or a plurality of wires 300 that extend through a single or a plurality of recesses 66 (46) of the second cutter 60 (and in some embodiments one or more recesses 46 in the first cutter 40), such that the location upon the cutting edges 68 (48) of the second cutter 60 (and first cutter 40) changes due to the position of the bushing 80.

Specifically, with the bushing 80 in the first position (FIG. 9, the centers 81a of the apertures 80 are above the longitudinal centerline 80), the wires 300 are aligned to interact with the first cutting portion 68a (68z1) of the first cutting edge. While not shown in FIG. 9, one of ordinary skill will comprehend with reference to the remaining figures that the wire 300 also is aligned with the first cutting portion 48a (48z1) of the cutting edge of the first cutter 40. Upon disassembly and reassembly of the bushing 80 to the position depicted in FIG. 10 (centers 81a below the longitudinal centerline 80a), the wire 300 is now aligned with the higher second cutting portion 68b (68z2) of the cutting edge of the second cutter 60 (and in some embodiments the second cutting edge 48b (48z2) of the first cutting edge of the first cutter 40. Accordingly, one of ordinary skill in the art will appreciate that the design of the bushing allows for two discrete cutting edges for wires 300 in the second cutter 60 and in some embodiments the first cutter 40 without replacement or service (resharpening) of the second cutter 60 (first cutter 40), which lengthens the life of the second cutter 60 (first cutter 40) with only a minor reconfiguration of the assembly 10 needed to reconfigure from the first to the second cutting portions.

Similarly, due to providing slots 75 on both ends 61 of the second cutter 60, the second cutter 60 can be aligned in two different orientations, a first with the first surface 63 facing the first cutter 40 and a second with a second surface 64 facing the first cutter 40. As shown in FIG. 7, a second cutting edge 69 may be provided at the edge between the second side surface 64 and the side walls of the recesses 66 such that the second cutting edges 69 may interact with the wire 300 (and the first cutter 40). The second cutting edges 69 may also have two cutting portions: either discrete cutting portions 69a, 69b (like 68a, 68b discussed above) or a long continuous edge 69z that extends between ends 69z1, 69z1 (like 68z1, 68z2 discussed above) such that in these embodiments, the second cutter 60 has four different cutting positions that can be easily adjusted with respect to the wires 300.

In some embodiments, the first cutter 40 may be formed with cutting edges 48, 49 on both opposite sides 43, 44 (with each cutting edge 48, 49 potentially formed in any of the different types similar to the cutting edges 68, 69 discussed above) to allow for four different cutting positions that can be easily adjusted with respect to the wires.

In some embodiments, the first cutter 40 may be a hardened steel member that is coated with nickel and/or PTFE coating to minimize the friction between the first and second cutters 40, 60 as the second cutter 60 moves with respect to the first cutter 40. In other embodiments, the first cutter 40 may be coated with other low friction coatings. In some embodiments, the second cutter 60 may be coated (with Nickel and/or PTFE or with other coatings) to similarly minimize friction.

A method of operation of a cutter for a tire bead winder is provided. The method includes the step of providing an assembly with a housing 20 and associated components discussed above. The next step provides operating the assembly with a first end of the second cutter 60 connected to the actuator 110 and the bushing 80 oriented such that the centers 81a of the apertures 81 are above the longitudinal centerline 80 of the bushing. After operation of the assembly 10 in cutting wires 300 the second cutter is flipped within the housing 20 such that the opposite second end 61 of the cutter 60 is connected to the actuator 110. Next after further operation of the assembly 10 to cut wires, the bushing 80 is flipped such that the centers 81a of the apertures 81 are disposed below the longitudinal centerline 80a of the bushing 80. Next after still further operation of the assembly to cut wires 300, the second cutter 60 is flipped such that the first end 61 is again reconnected to the arm of the actuator 110.

In other embodiments, the order of these method steps may be modified, such as flipping the orientation of the bushing with the same end of the second cutter 60 connected to the arm 120 of the actuator, and then switching the ends of the second cutter 60 and finally flipping the orientation of the bushing 80 (with operation of the assembly 10 to cut wire 300 between each step). Finally, the method may be modified to additionally flip the side of the first cutter 40 that faces the second cutter 60 such that the opposite cutting edges 48, 49 engage the wire 300 during operations. In some embodiments where the bushing 80 engages both the first and second cutters 60, 40, the flipping of the bushing 80 modifies the height of both of the first and second cutters 40, 60 (and specifically the location of the cutting edge portions) with respect to the wires 300 running through the recesses (46, 66), when the assembly 10 is lowered to a position where the wires 300 extend through the recesses 46, 66.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. A cutting apparatus for an elongate wire, comprising:
a housing that supports a first cutter that has a body, a recess, and a cutting blade, wherein the cutting blade is disposed upon a wall of the body that defines the recess, the first cutter is fixed with respect to the housing,
the housing additionally supports a second cutter that has a body, a recess, and a cutting blade, wherein the cutting blade is disposed upon a wall of the body that defines the recess, the second cutter is reciprocatingly movable with respect to the housing and with respect to the first cutter, wherein the second cutter is normally positioned with respect to the first cutter such that the recess of the first cutter is aligned with the recess of the second cutter, and wherein the second cutter is movable to a second position where the recess of the second cutter translates with respect to the recess of the first cutter, such that the respective cutting blades of the first and second cutters translate toward each other,
an input device fixed to the second cutter to urge linear motion of the second cutter with respect to the first cutter,
wherein the first and second cutters can be mounted with respect to each other at a first operative vertical position with respect to the housing and a second operative vertical position above the first operative vertical position.

2. The cutting apparatus of claim 1, further comprising a bushing that aligns the first and second cutters in either the first vertical position or the second vertical position, wherein the bushing comprises a horizontal centerline and an alignment hole, wherein a center of the alignment hole is vertically offset from the horizontal centerline, wherein the first and second cutters are disposed in the first vertical position when the center of the alignment hole is disposed above the horizontal centerline and the first and second cutters are disposed in the second vertical position when the center of the alignment hole is disposed below the horizontal centerline.

3. The cutting apparatus of claim 2, wherein the second cutter comprises a horizontal slot disposed through the body of the second cutter, wherein the bushing extends through the horizontal slot.

4. The cutting apparatus of claim 3, wherein the first cutter comprises a horizontal slot disposed through the body of the first cutter, wherein the bushing extends through the horizontal slot.

5. The cutting apparatus of claim 1, wherein the housing supports a comb that includes a recess that is aligned with the recess of the first cutter.

6. The cutting apparatus of claim 1, wherein the housing supports an actuator that is engaged with the second cutter, wherein operation of the actuator urges the second cutter toward the second position and then returns the second cutter to the first position.

7. The cutting apparatus of claim 6, wherein the actuator includes an arm that engages a horizontal end of the second cutter such that reciprocation of the arm by the actuator urges the second cutter to reciprocate between the second and first position, wherein the second cutter can receive the arm on both horizontal ends of the second cutter such that the second cutter can reciprocate with respect to the first cutter when a first side surface faces the first cutter and when a second side surface opposite from the first side surface faces the first cutter.

8. The cutting apparatus of claim 7, wherein the second cutter includes a slot on each opposite horizontal end that can receive the arm.

9. The cutting apparatus of claim 8, wherein the slots on the second cutter are "T" shaped with the top of the "T" extending toward the center of the second cutter, wherein the arm from the actuator is correspondingly "T" shaped, wherein the width of the top of the "T" in each slot is wider than the top of the "T" of the arm by a distance equal to or greater than a difference in height between the first and second consistent vertical positions of the first and second cutters.

10. The cutting apparatus of claim 1, wherein the housing and the associated first and second cutters can be raised and lowered as a unit.

11. The cutting apparatus of claim 1, wherein the recess and the cutting blade of the first cutter are a plurality of recesses and a plurality of cutting blades that are each disposed upon a wall of the body that defines the respective recess of the plurality of recesses, and wherein the recess and the cutting blade of the second cutter are a plurality of recesses and a plurality of cutting blades that are each disposed upon a wall of the body that defines the respective recess of the plurality of recesses, wherein when the second cutter is in the first position, each of the plurality of recesses of the first cutter are aligned with a respective recess of the plurality of recesses of the second cutter, and wherein when the second cutter is in the second position the opposed cutting blades of the first and second cutting blades at each respective recess cross over each other.

12. The cutting apparatus of claim 1, wherein the second cutting blade comprises a first planar side surface and an opposite planar side surface, and wherein the cutting blade comprises a first cutting blade at an edge of the recess with the first planar side surface and wherein the cutting blade comprises a second cutting blade at a second edge of the recess with the second planar side surface, wherein the first cutting edge interacts with the first cutter when the first planar side surface faces the first cutter and wherein the second cutting edge interacts with the first cutter when the second planar side surface faces the first cutter.

13. The cutting apparatus of claim 12, wherein the first cutting blade comprises a first cutting portion and a second cutting portion and the second cutting blade comprises a first cutting portion and a second cutting portion, and wherein the recess of the first cutter comprises a first cutting portion and a second cutting portion, wherein the first cutting portion of the recess of the first cutter is horizontally aligned with the first cutting portion of the first cutting blade of the second cutter, and wherein the second cutting portion of the recess of the first cutter is horizontally aligned with the second cutting portion of the first cutting blade of the second cutter.

14. The cutting apparatus of claim 2, further comprising a bolt that extends through the housing and the alignment hole.

15. A cutting apparatus for an elongate wire, comprising:
a housing that supports a first cutter that has a body, a recess, and a cutting blade, wherein the cutting blade is disposed upon a wall of the body that defines the recess, the first cutter is fixed with respect to the housing,
the housing additionally supports a second cutter that has a body, a recess, and a cutting blade, wherein the cutting blade is disposed upon a wall of the body that defines the recess, the second cutter is reciprocatingly movable with respect to the housing and with respect to the first cutter, wherein the second cutter is normally positioned with respect to the first cutter such that the recess of the first cutter is aligned with the recess of the second cutter, and wherein the second cutter is movable to a second position where the recess of the second cutter translates with respect to the recess of the first cutter, such that the respective cutting blades of the first and second cutters translate toward each other, an actuator that is engaged with the second cutter, wherein operation of the actuator urges the second cutter toward the second position and then returns the second cutter to the first position, wherein the actuator includes an arm that engages a horizontal end of the second cutter such that reciprocation of the arm by the actuator urges the second cutter to reciprocate between the second and first position, wherein the second cutter can receive the arm on both horizontal ends of the second cutter such that the second cutter can reciprocate with respect to the first cutter when a first side surface faces the first cutter and when a second side surface opposite from the first side surface faces the first cutter.

16. The cutting apparatus of claim 15, wherein the second cutter includes a slot on each opposite horizontal end that can receive the arm.

17. The cutting apparatus of claim 16, wherein the slots on the second cutter are "T" shaped with the top of the "T" extending toward the center of the second cutter, wherein the arm from the actuator is correspondingly "T" shaped.

18. The cutting device of claim 15, wherein the first and second cutters can be mounted with respect to each other at a first operative vertical position with respect to the housing and a second operative vertical position above the first operative vertical position.

19. The cutting device of claim 18, further comprising a bushing that aligns the first and second cutters in either the first vertical position or the second vertical position, wherein the bushing comprises a horizontal centerline and an alignment hole, wherein a center of the alignment hole is vertically offset from the horizontal centerline, wherein the first and second cutters are disposed in the first vertical position when the center of the alignment hole is disposed above the horizontal centerline and the first and second cutters are disposed in the second vertical position when the center of the alignment hole is disposed below the horizontal centerline.

20. A cutting device suitable for cutting an elongate wire, comprising:
  a cutter having a body, a recess, and a cutting blade, wherein the cutting blade is disposed upon a wall of the body that defines the recess,
  wherein the body of the cutter has first and second opposing horizontal ends,
  wherein the cutter can selectively receive an arm of an actuator on both horizontal ends of the cutter,
  wherein the cutter includes a slot on each of the first and second opposing horizontal ends, such that reciprocating movement of the cutter is capable when the arm of the actuator is disposed in the slot of the first opposing horizontal end in a first operation or, after the first operation, when the actuator is disposed in the slot of the second opposing horizontal end.

* * * * *